United States Patent [19]
Tice

[11] Patent Number: 5,543,694
[45] Date of Patent: Aug. 6, 1996

[54] CONTROL CIRCUIT FOR FEEDBACK, MOTOR-OPERATED VALVE

[75] Inventor: Bill Tice, Carlsbad, Calif.

[73] Assignee: ETI Systems, Carlsbad, Calif.

[21] Appl. No.: 405,089

[22] Filed: Mar. 16, 1995

Related U.S. Application Data

[62] Division of Ser. No. 177,062, Jan. 3, 1994, Pat. No. 5,461,290.

[51] Int. Cl.⁶ ..................................................... H02P 3/12
[52] U.S. Cl. ............................ 318/379.000; 318/431.000
[58] Field of Search ................................... 318/430, 431, 318/685, 696, 375, 379, 380

[56] References Cited

U.S. PATENT DOCUMENTS

| | | | |
|---|---|---|---|
| 4,208,868 | 6/1980 | Regnier et al. | 318/138 |
| 4,353,021 | 10/1982 | Watanabe et al. | 318/696 |
| 4,517,502 | 5/1985 | Aschoff et al. | 318/474 |
| 4,574,228 | 3/1986 | Blue et al. | 318/696 |

*Primary Examiner*—Bentsu Ro
*Attorney, Agent, or Firm*—John J. Murphy; Murphey Law Offices

[57] ABSTRACT

A control circuit for limiting the current flow to a direct-current driven motor, to reduce current spikes at motor start up, including a voltage-regulated, current-passing device for passing current from a direct voltage source to the motor, the device having a default configuration such as to permit full current flow there-across when the voltage is initially applied, a voltage drop device interposed the voltage source and the voltage-regulated, current-passing device responsive to the current flow to the motor and a variable-voltage output device responsive to the voltage drop developed in the voltage-drop device for providing a subsequently changing voltage for input to the current-passing device for limiting the current flow therethrough following initial application of the voltage.

9 Claims, 3 Drawing Sheets

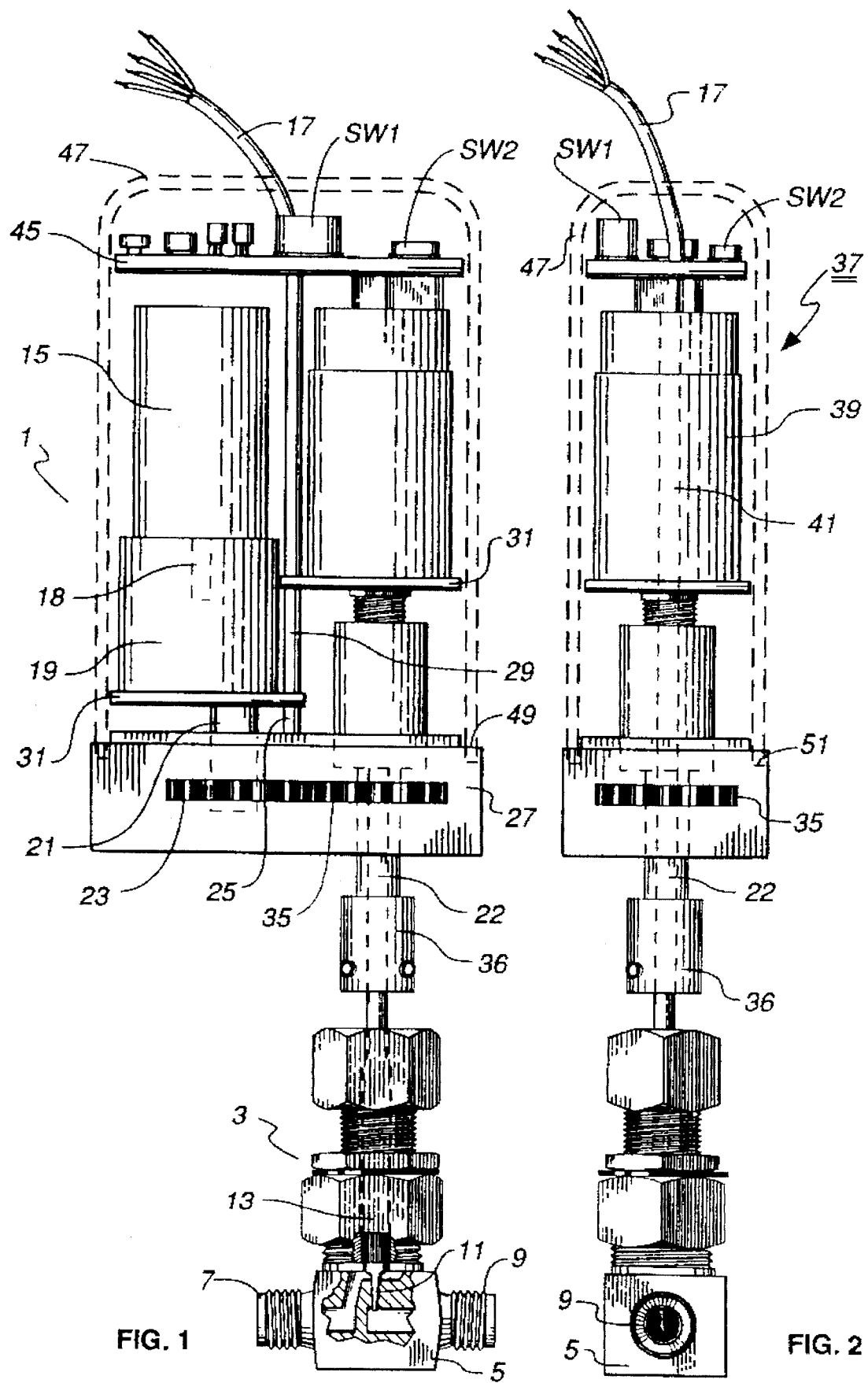

CONTROL CIRCUIT FOR FEEDBACK, MOTOR-OPERATED VALVE

This application is a divisional application of Ser. No. 08/177,062 filed Jan. 3, 1994 now U.S. Pat. No. 5,461,290, issued Oct. 24, 1995.

BACKGROUND OF THE INVENTION

1. Field of the Invention

This invention pertains to the field of flow-control devices. More particularly, it relates to motor-driven control valves and corresponding control circuit for use with them that combines the unique concepts of limiting the current flow to the valve drive motor to overcome stiction, providing for instantaneous braking, and utilizing controlled rotation of the motor for precise valve positioning. Damage prevention is obtained by elimination of over-rotation thereof through utilization of a normally open limit switch, limiting the motor drive gross movement of the valve stem.

2. Description of the Prior Art

Many processes involve the flow of liquids and gasses in tubes and pipes and require controlled regulation. Needle valves, regulating valves and shut-off valves are examples of controlled regulation used to control the flow of these materials. In multiple valves or remote location applications, the industry adopted a convention whereby motors drive the valves from fully open to fully closed positions and to desired positions therebetween. The motors used in the industry include electric, stepper and pulse motors and the means to control them vary from simple on-off switches to feedback mechanisms coupled to computer circuitry.

An electric-drive motor, usually a direct current driven motor of the reversible type, is connected to the valve stem that protrudes from the valve body. Control means are attached to the motor to provide positive or negative direct current to drive it and the valve stem in one direction or another. The motor is usually small, having very high speed output, usually in the 4,000 to 6,000 rpm range. The motor is connected to the valve stem through a transmission that gears the high incoming rpm down to a very low range of 10 to 20 rpm. Certain problems have developed in this field and have not yet been solved so that the full utilization of motor control has not yet occurred.

For instance, one problem concerns the application of motor control to valve closure. Through repeated opening and closing of the valve, the valve seat wears, thus making the valve element that closes against the valve seat travel further into the valve housing. Since virtually all valve elements advance toward and away from the valve seat through screw threads, the wearing of the valve seat requires the valve element and stem extending therefrom to close against the valve seat at progressively different angular positions. This means that the valve cannot be predicted to close at any particular angular position of the stem because the slightest wear on the seat will prevent the angular position from insuring that the valve is closed. When this occurs the valve will leak.

In the prior art, valves are set to be closed by ordering the drive motor to turn the valve stem until it stops turning, i.e., has forced the valve element fully against the valve seat. To little motor power will not ensure a fully closed valve and too much motor power may cause the valve element to mash hard against the valve seat, causing increased wear in the valve or damage to the transmission gears and other components. To avoid these situations, the prior art has established the practice of sizing the drive motor to stall at the maximum friction load needed to just close the valve. In other words, the motor will just close the valve and remain in a stall condition to hold the valve shut. This convention wastes electrical power during extensive valve-closure periods, and causes wear on the motor and drive gears in the form of vibration, called "chatter". Furthermore, should a power failure occur during this valve-closure hiatus, the drive motor would cease its electrical stall and possibly allow the closed valve to drift open and allow undesired backflow.

Also, there is the problem known as "stiction". This term comes about because of frictional buildup in the valve. While the valve stem is in motion, there is generally constant friction encountered in the valve and the load on the drive motor remains relatively uniform. That is to say, there is no buildup of forces in the valve itself and the movement from full-open to nearly full-closed position may be handled by the drive motor without difficulty. However, when the valve reaches the fully-closed position, a sudden increase in frictional load occurs in the valve stem because of tightness achieved between the valve parts as well as some friction buildup caused by flow interruption in the line. To open a fully-closed valve, therefore, requires the drive motor to initially overcome this rather large frictional force or "stiction". Once the valve is cracked open by the drive motor, the stem friction drops to the relatively low value throughout the remainder of valve travel. With the prior art drive motor at stall condition, holding the valve closed, there is not enough additional power during reverse operation to overcome this stiction and the valve often remains closed until movement is started by hand.

In my previously issued U.S. Pat. No. 5,137,257, I have disclosed and claimed a means freely rotatable with the motor drive shaft for providing a controlled amount of overturning of the motor-drive shaft following full closure of the valve element against the valve seats and simultaneously storing a portion of the drive energy expended in the overturning to bias the valve in its closed position, and to discharge the stored energy to aid in opening the valve upon reverse turning of the drive motor and motor-drive shaft.

However, further problems have been determined to exist in the day-to-day operation of such a valve. Because of the high rotation speed of the motor and its sudden start-stop operation, the associated gears tend to wear and deteriorate over time, causing motor failure. Additionally, when electrical energy, in the form of DC current in the amount of 12 or 24 volts, is applied to the electric drive motor, there is a surge of current that passes into the motor and through the commutator that eventually subsides to an amount of current proportionate to the load on the motor. During this initial surge, or "spike" as it is known in the trade, arcing occurs between the motor brushes and the commutator such that, over a period of time, the commutator shows signs of wear and erosion and eventually fails, thereby rendering the motor unusable. Because the motor is so small and further because it is made by high-speed production techniques, the cost of repairing the motor is significantly large compared with the initial price thereof. It is not uncommon for motors, such as those presently used in motor-driven valves of the type herein described, to have a useful life limited to about 2500 hours.

Another significant problem exists with respect to the motor continuing to turn after power has been terminated thereto. The transmission, including the numerous gears, cause a significant load to the motor. The motor spins at very high rpm to drive the transmission that, in turn, drives the needle valve to its various controlled positions. The high rpm of the motor develops a significant inertia. The inertia does not allow the motor to stop immediately upon command. The motor continues to rotate powered by the inertia. Thereby the valve is turned beyond the point at which the controller signals a cessation of motor drive and the resulting valve position is not where it should be. When this happens, the controller must order the motor to reverse direction and bring the valve into proper position. This extra movement of the motor results in more wear which is a factor in early motor replacement. Finally, a limit switch is often placed in series with the valve stem. This limit switch operates independent of the controller and it establishes the point beyond which the valve stem is not to be turned, so that valve damage is held to a minimum. In the prior art, the limit switch is generally a normally-closed single pole switch, carrying current therethrough. Such use of the limit switch requires it to shoulder the burden of handling electrical current throughout the valve travel. Such use reduces the work-life of the limit switch. Its failure to continually carry current to the motor results in positioning the valve at undesired settings and disrupts the process in which the valve is an important part.

SUMMARY OF THE INVENTION

This invention is a control circuit for use with motor-driven valve assemblies that solves or at least reduces the aforesaid problems to manageable proportions. The invention includes a current-limiting feature that substantially reduces the current surge that occurs to the motor during its start up condition. This has the effect of extending the life of the motor up to two hundred percent. In addition, the control circuit contains a feature for instantaneously braking or stopping the rotation of the drive motor to more precisely locate the valve at the desired point called for by the controller. Still further, this novel control circuit contains a normally open limit switch, closing upon reaching one of the limits preset in the device. This action reduces the load on the limit switch and greatly extends the operative life of the switch. Still further, this invention provides a novel concept to remove the problem of "stiction". This invention is applicable to motor rotation in both the forward and reverse directions.

The current-limiting and surge-reducing feature of the control circuit generally comprises a voltage-regulated, current-passing means for passing current from the direct voltage source to the motor, having a default configuration such as to permit full current flow thereacross when the voltage is initially applied; voltage-drop means interposed the voltage source and the voltage-regulated, current-passing means responsive to the current flow to the motor, and, variable-voltage output means responsive to the voltage drop developed in the voltage-drop means for providing a subsequently changing voltage input to the current-passing means for limiting the current flow therethrough following initial application of the voltage. By limiting the current to the motor when it is turning the valve in the forward direction, such as when the valve is driven closed, compared to the current to the motor when it is driving the valve in the reverse direction or opening it, provides more torque for opening than for closing and overcomes "stiction".

The instantaneous braking action of the control circuit generally comprises a means for storing a voltage during circuit operation, including a switch element for deactivating the voltage storing means from the stored voltage, voltage-regulated, current-passing means for passing current from the direct-voltage source to the motor, a normally-open, voltage-actuated switch interconnected the motor terminals to ground, and normally-closed, voltage-regulated switch means held open during application of power to the motor whereupon terminating drive voltage to the motor causes the normally-open, voltage-actuated switch means to close and release the stored voltage simultaneously to the switch element, to deactivate the current-passing means, and to close the normally-open, voltage-actuated switch means and ground the motor terminals and the motor to immediately drain all forward and reverse EMF to ground stopping rotation of the motor.

The switch-limiting feature of the control circuit generally comprises voltage-regulated, current-passing means for passing current from the direct voltage source to the motor, the means having a default configuration such as to permit full current flow there-across when the voltage is initially applied; a normally-open, voltage-actuated switch interconnecting the motor terminals to ground; and, a normally-open, limit-switch interconnecting the voltage source, and the voltage-regulated, current-passing means, and the normally-open, voltage-actuated switch means that remains open during travel of the valve between limits physically established in the assembly so that, upon reaching one of the limits, the limit switch closes to provide voltage to the voltage-regulated, current-passing means to instantaneously stop current flow thereacross from the source to the motor and voltage to the normally-open, voltage-actuated switch means to close the switch to immediately drain all forward and reverse EMF to ground and stop rotation of the motor.

Each of these features may be combined separately with the feedback, motor-operated valve set forth in my previous patent, or may be applied to other types of direct-current, motor-driven-valve, assemblies. The maximum benefit, however, is achieved when the current-spike limiting, stiction reduction, instantaneous-braking and limit-switching features are all present at one time in the control circuit.

Accordingly, the main object of this invention is to provide a control circuit for use with a motor-driven, valve-positioning device that restricts the current surge that exists or is developed when current is first applied to the drive motor. Other objects of the invention include a control circuit having a feature of instantaneously braking the rotation of the drive motor to more precisely locate the valve at the position called for by the controller and a control circuit that eliminates stiction in the valve. A still further object of the invention is a control circuit containing limit-switch circuitry wherein the limit switch is in the normally open position and only closes when it is required to stop the drive motor to prevent the valve from overturning beyond a fixed or desirable point.

Other objects of the invention include a control circuit that is of such small size that it can be placed in a container along with the drive motor, the transmission, the limit switch and the means previously disclosed and claimed in U.S. Pat. No. 5,137,257, for providing a controlled amount of overturning of said drive-motor shaft following full closure of the valve element against the valve seat.

These and other objects of the invention may be observed by reading the following description of the preferred embodiment in conjunction with the drawings appended hereto. The scope of coverage sought by the inventor may be gleaned from a close reading of the Claims that conclude this specification.

DESCRIPTION OF THE DRAWINGS

FIG. 1 is a front elevational view of the typical feedback, motor-operated valve to which the control circuit is applicable;

FIG. 2 is a side elevation view of the same embodiment shown in FIG. 1 showing more of the frame upon which the motor-operated valve and other components are mounted;

DESCRIPTION OF THE PREFERRED EMBODIMENT

Figure 3:
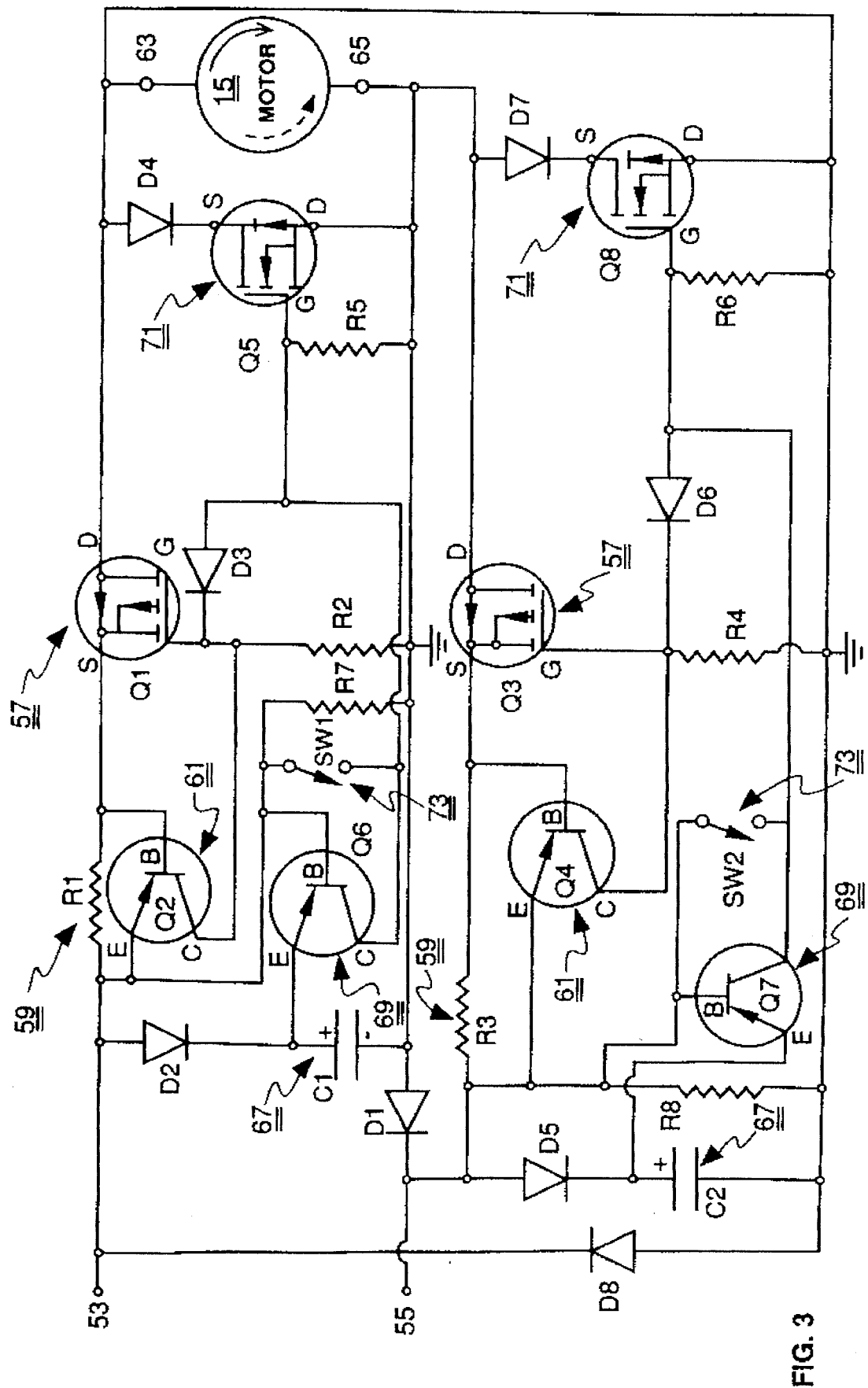
FIG. 3 is a schematic diagram of the preferred embodiment of the control circuit for use herein; and, FIG. 4 is a graph showing the current-limiting feature of this inventive control circuit compared to the current wave form when the circuit is not used.

This control circuit is designed for use with a valve drive assembly 1 as shown in FIGS. 1 and 2. Typically, assembly 1 is attached to a needle valve assembly 3 that comprises a valve casing 5, having a valve inlet 7 and valve outlet 9 separated by a valve seat 11 operably positioned therebetween. A valve stem 13, having a conical head machined thereon, is threadably positioned in the casing for screw-like movement into and out of sealing engagement with the valve seat. Valve stem 13 extends outward from case 5 for actuation from fully-closed to fully-opened and to various positions therebetween. Packing (not shown) is usually placed about the valve stem to prevent leakage from the valve means.

As shown in FIGS. 1 and 2, an electric drive-motor 15 is provided that receives power through a cable 17 and is interconnected through a drive shaft 18 to a gear reduction transmission 19 to an output shaft 21. Motor 15 is generally driven by 12 volts DC power and turns upwards of 6–8,000 rpm. Gear reduction transmission 19 gears down or reduces that speed to the output shaft speed of approximately 20 to 40 rpm, terminating in a drive gear 23. A frame 25 is arranged about the components to stabilize and mount them in appropriate location. Frame 25 includes a frame base 27, extension bolts 29 that are threadably mounted therein and a plurality of spaced-apart mounting plates 31, attached to said extension bolts, on which the various components are mounted. Drive gear 23 is meshed with a driven gear 35 being essentially of the same size and number of gear teeth. As arranged, and with drive gear 23 and driven gear 35 being the same size and having the same number of gear teeth, one turn of motor-driven output shaft 21 results in one turn of a driven shaft 22, and, through a coupling sleeve 36, one turn of valve stem 13. Usually, motor driven valves of the type shown here require numerous turns of the valve stem between opened and closed positions yet are substantially linear with respect to the turns per degree of opening of the valve.

An electro-mechanical feed back means 37 is provided and operably connected to either transmission output shaft 21 or driven shaft 22. As shown in FIGS. 1 and 2, means 37 is connected to driven shaft 22 and comprises a potentiometer in the form of a cylindrically-shaped resistance body 39 having a movable internal wiper (not shown) actuated by a turnable shaft 41 extending from said body. The total resistance may be on the order of, for example, 500 ohms, and taking, for example, ten turns of shaft 41 to proceed from zero to 500 ohms. The potentiometer usually has three electric taps, as shown. Other types of electro-mechanical feedback devices are just as useful herein, such as variable inductors, mechanical-to-electrical transducers and encoders, and all are fully contemplated for use herein within the scope and spirit of the invention.

An electric signal in the form of a certain amount of voltage, such as 12 volts DC, is sent through a balancing amplifier unit (not shown), via cable 17 to two of the taps calling for the potentiometer to produce a certain voltage at the third tap. Should drive motor 15 not be in a position to provide the appropriate output signal or voltage, current will be applied to motor 15 to turn it one way or the other to cause potentiometer shaft 41 to move the slide to a position where the proper signal is outputted so that the amplifier will become balanced and the motor ordered to stop. In this manner, the input signal to feedback means 37 controls the direction and distance motor drive shaft 18 will move valve stem 13 toward and away from valve seat 11. A pair of limit switches SW1 and SW2 are positioned above feedback potentiometer 39 and are manually set to prevent driven shaft 22 from turning valve stem 13 beyond its maximum opening and beyond its full closing or, if the overturning means of my previously issued patent is used, then to prevent it from overturning beyond the angular rotation established for the overturning.

The preferred embodiment of the control circuit, shown in FIG. 3, is mounted on a circuit board 45 and positioned above all the components. The essential elements of the circuit will be hereinafter explained more fully. A cover 47 is provided (shown in dotted outline) to encase all of the aforesaid components and is defined by a lower marginal edge 49 that fits into a recess 51 formed in frame base 27. Cover 47 keeps dust, dirt and other potential invasive materials from entering the area about the various components and maintains a clean environment in which each of the components may operate.

Referring now to FIG. 3, the circuit of this invention is conveniently contained on circuit board 45 on which are mounted a series of components including diodes, resistors, capacitors, transistors, including field effect transistors, and switches. The solid lines between components refer to conductors and will not be individually numbered except where necessary. Where conductors cross and the intersection is marked with a dot or period, it is a junction between them; where one conductor crosses another and the intersection has no dot, there is no junction. The small capital letters next to lines terminating at a components, such as E, B, C, G, S, and D represent singular subcomponents of the component such as Emitter, Base, Collector, Gate, Source and Drain. Transistors and fets (a type of transistor known as a Field Effect Transistor ) are marked with a number beginning with "Q"; resistors with a number beginning with "R"; capacitors with "C"; diodes with "D"; and, switches with "S". This is common in the art.

As shown in FIG. 3, pins 53 and 55 indicate the input of a voltage such as 12 volts DC power to the circuit. The plus and minus signs adjacent pins 53 and 55 indicate that the potential between said pins may be, for example, +12 volts or −12 volts . This is necessary to drive motor 15 in a forward (positive) direction or a reverse (negative) direction. The circuit shown in FIG. 3 contains, in the bottom half, an iteration of the components shown in the upper half. This iteration allows the circuit to drive motor 15 in both forward and rearward directions.

To describe the current-limiting feature of the circuit, a voltage-regulated, current-passing means 57 is arranged between the voltage source, pin 53, and motor 15. Its use is to pass current from pin 53 to motor 15 and it has a default configuration such as to permit full current flow when voltage is initially applied to pin 53. It is preferred that means 57 comprise P-channel MOSFETS Q1 and Q3. A voltage drop means 59 is interposed pin 53 and means 57 that, as will be shown, is responsive to the current flow to the motor. It is preferred that means 59 comprise current-limiting resistors R1 and R3. A variable-voltage output means 61, responsive to the voltage drop developed in voltage-drop means 59, provides subsequent changing voltage for input to current-passing means 57 for limiting the current flow therethrough following initial application of voltage. It is preferred that means 61 comprise PNP transistors Q2 and Q4.

To further illustrate the operation, an input voltage of 12 volts DC is impressed at pin 53 so that it is "high" while pin 55 is "low" or at ground. This is common parlance in the art. When said voltage is applied between pins 53 and 55, the same positive voltage is applied directly to the emitter(E) of transistor Q2 and simultaneously to current-limiting resistor R1. Q1 is connected through its source(S) downstream from current-limiting resistor R1 wherein its drain(D) is connected to pin 63 at motor 15. The base(B) of transistor Q2 is interposed current-limiting resistor R1 and the source of MOSFET Q2. At the initial impression of voltage to pin 53, the emitter-to-base potential of transistor Q2 is essentially zero (known as "reversed biased" in the art) so that the collector(C) of Q2 does not receive any voltage. The collector at Q2 is connected to the gate(G) of MOSFET Q1 and, with no voltage during the initial impression of positive voltage to pin 53, the voltage at the gate of MOSFET Q1 is approximately zero. As is known in the art, a P-channel MOSFET having a positive source-to-gate potential (×12 volts in this case) is said to be "forward biased" or turned "on" and allows passage of full current between the source and the drain so that the full 12 volts is applied directly to motor 15. At this time direct current also begins to flow from pin 53 through current-limiting resistor R1 and across the source-drain of MOSFET Q2 directly to motor 15 to power it in a forward motion indicated by the solid arrow.

Current limiting now begins. As voltage is applied to the source of MOSFET Q1 turns on, current begins to flow through current-limiting resistor R1 creating a voltage drop thereacross. The voltage drop across said resistor causes a positive potential to develop between the emitter and base of transistor Q2 ("forward biasing"). As in all PNP transistors, when it is forward biased, it is turned "on", allowing current to begin to flow from the emitter to the collector in Q2. A resistor R2 interconnected the gate in MOSFET Q1 and pin 55 receives the potential developed at the collector and develops a voltage drop thereacross. This voltage appears at the gate in MOSFET Q1 reducing the source-to-gate potential. As in all P-channel MOSFETS, lowering the source-to-gate potential causes a reduction in current flow through the source-drain of the MOSFET (it is said to begin to "turn off" or move into "reverse bias") so that Q2 begins to limit the current to motor 15. As the current flow is reduced, the voltage drop across current-limiting resistor R1 decreases thereby reducing the forward bias of transistor Q2 and accordingly decreasing the current flow through the collector of Q2. The voltage at the gate of Q1 is correspondingly reduced thus increasing the source-gate voltage drop and increasing its ability to pass current from the source through the drain. The dynamics of these two activities, i.e., the current-passing ability from the source to the drain of MOSFET Q1 and the voltage collected at the collector of transistor Q2 that feeds the gate of MOSFET Q1, operate to depress the current spike normally developed at motor 15 when it is impressed with the initial voltage.

Figure 4:
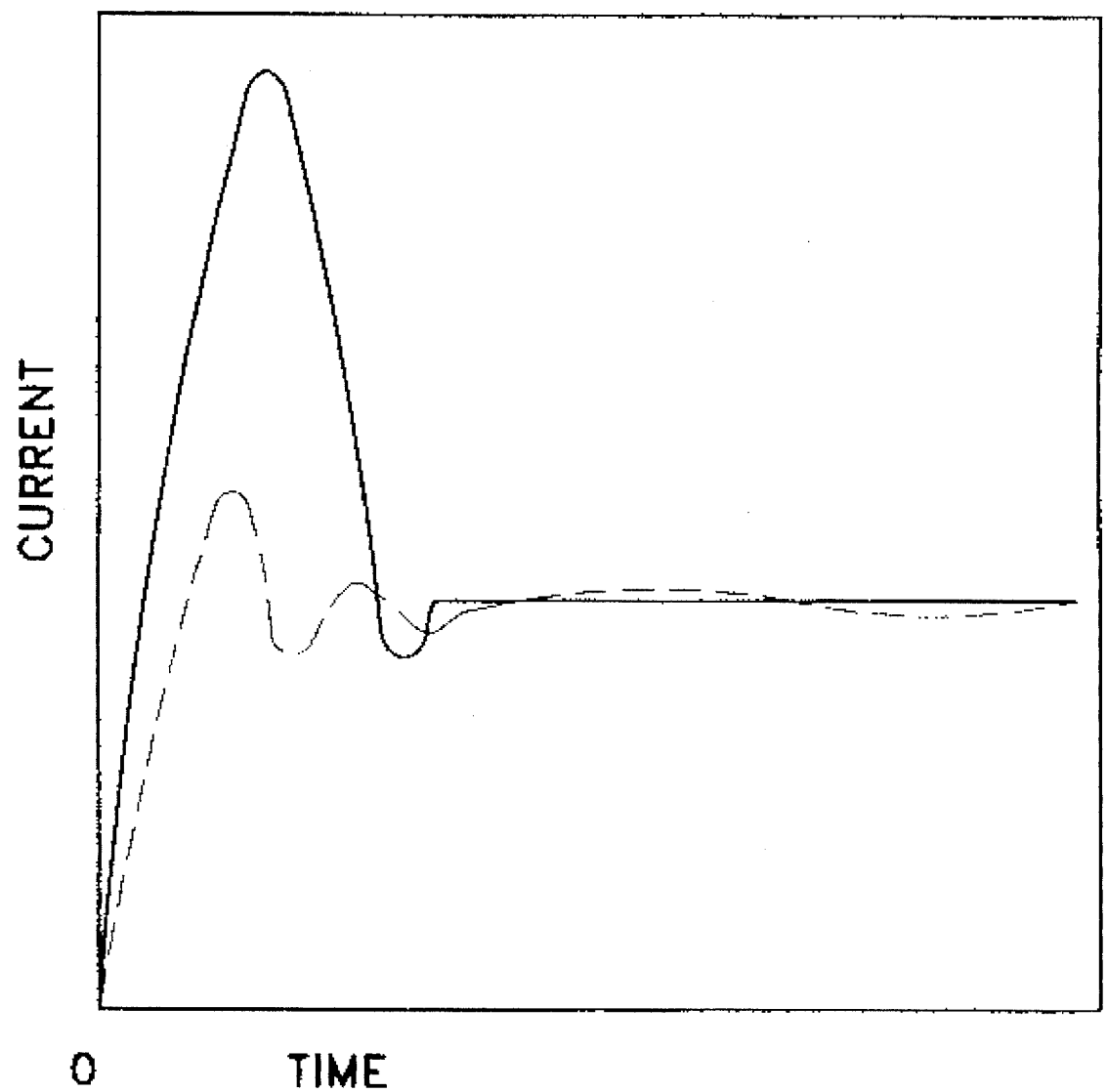

Referring to FIG. 4, the solid line indicates the current and its spike developed when the current-limiting control circuit of this invention is not used with the motor herein. The current-limiting feature of the control circuit shows a different wave form in dotted lines and shows a significant reduction in the current spike. The uncontrolled current spike has led to the limited useful life of many motors used in this type of situation.

When the input voltage of 12 volts DC is applied to pin 53, pin 55 is low or at ground potential and diodes D1 and D8 are reverse biased which turns off the complete bottom half or iteration portion of the circuit shown in FIG. 3. This half of the circuit becomes active when the input voltage is applied to pin 55 and it becomes high while pin 53 becomes low or ground through forward biased diode D8. The only difference between the upper and lower halves of the circuit is the polarity of the voltage applied to motor 15 which controls the direction of rotation. In other words, for a reverse impression of polarity, pin 55 would be high and a voltage would immediately be impressed across current-limiting resistor R3, the source to drain of P-channel MOSFET Q3 to pin 65 on the opposite side of motor 15 from pin 63 so that motor 15 would turn in the opposite direction as indicated by the dotted arrow. The same functions of P-channel MOSFET Q3 and PNP transistor Q4 will result, with its emitter, base and collector and the development of a voltage drop across resistor R4 to the gate at MOSFET Q3.

By setting the resistance of R1 to a larger value than that of resistor R3, a novel concept is developed to overcome "stiction". The larger value of R1 means that current to pin 63 on motor 15 is less, for driving the valve closed, than the current passed to pin 65 to drive the valve open. As long as the current passing through resistor R1 provides enough torque to drive the valve fully closed, then the increased torque, from the greater amount of current passing through R3, will overcome "stiction" and open the valve.

To describe the dynamic braking feature of the circuit, a means 67 for storing a potential during circuit operation is provided, along with voltage-regulated, current-passing means 57. It is preferred that means 67 comprise capacitors C1 and C2 although a battery or other voltage source is also useable therein. A normally-open, voltage-actuated first switch means 69 is also provided for isolating the stored potential from the rest of the circuit during operation of drive motor 15, along with a normally-open, voltage-actuated second switch means 71 interconnected first switch means 69, potential storing means 67 and current passing means 57. It is preferred that first switch means 69 comprise PNP transistors Q6 and Q7 and second switch means 71 comprise N-channel MOSFETs Q5 and Q8. Upon cessation of input power, the stored potential is released through the emitter (E) to the collector (C) of transistor Q6 (Q6 is forward biased because the base (B) is a zero potential and the voltage at capacitor C1 is impressed directly upon emitter (E)) to the gate (G) of MOSFET Q1 to open it and stop all current passing from source (S) to drain (D), and simultaneously apply voltage to gate (G) of N-channel MOSFET Q5 to close the switch between source (S) and drain (D) and drain all reverse EMF from motor 15. As is known in the art, with respect to N-channel MOSFETs, applying voltage to the gate (G) closes the path between source (S) and drain (D).

To further illustrate the operation, capacitor C1 is interposed the emitter of transistor Q6 and ground. The base of transistor Q6 is interposed pin 53 and ground. The collector of transistor Q6 is interconnected the gate of MOSFET Q1 through a diode D3 and the gate of MOSFET Q5. The source of MOSFET Q5 is connected through a diode D4 to the drain of MOSFET Q1 and motor pin 63 while the drain of MOSFET Q5 is grounded. The gate of MOSFET Q5 is also grounded through a resistor R5.

When an input voltage of 12 volts DC is impressed on pin 53 (pin 53 is high, pin 55 is ground or low), diode D2 becomes forward biased allowing the impressed voltage to charge capacitor C1 to a voltage level of approximately 10.7 volts. This charged voltage level at C1 is applied to the emitter of transistor Q6. As the base of transistor Q6 is connected to the input voltage at pin 53, there is no voltage or potential drop between the emitter and the collector of transistor Q5, and, this lack of a voltage drop reverse biases Q6 and prevents the collector from emitting any voltage or current. With the voltage level at the collector of transistor Q6 at zero, because Q6 is turned off, diode D3, interposed between the collector of transistor Q6 and the gate of MOSFET Q1 also is reverse biased and the voltage potential between the gate and the source of MOSFET Q5 is also essentially zero. As with all N-channel MOSFETs, a zero or negative potential between the gate and source prevent any current passage between the source and the drain. This is known in the art as having the MOSFET turned "off". This is the condition of the circuit as motor 15 is operating. When the controller orders a cessation in voltage or power input to pin 53, instantaneous braking occurs.

When the input voltage at pin 53 is terminated, transistor Q6 becomes forward biased because, while the emitter remains at the 10.2 volt potential level, the base potential drops to about zero thereby causing the forward bias or potential drop between the emitter and the base of transistor Q5 allowing the collector to accept voltage. Transistor Q6 now is turned "on". And capacitor C1 begins to discharge its stored voltage through the emitter. Note that there is no loss of voltage back to pin 53 because diode D2 is interposed between capacitor C1 and pin 53, the emitter of transistor Q2 and current-limiting resistor R1. The discharging of the potential from capacitor C1 into the emitter of transistor Q6 causes a current to flow from the collector through resistor R5 to ground. This resistance develops a potential at the gate of MOSFET Q5 and simultaneously at the gate of MOSFET Q1. MOSFET Q1 is immediately turned off so that further current does not pass from the source to the drain (and vice versa) while simultaneously a path is opened between the source and the drain of MOSFET Q5 to ground out any reverse EMF generated at pin 63. That EMF passes through diode D4 and across the source to drain of MOSFET Q5 directly to ground. Accordingly, while the input voltage and associated current has been terminated at pin 53, the reverse EMF developed by motor 15 is immediately drained through diode D4 and MOSFET Q6 to ground, thus removing both forward and reverse EMF from motor 15 and resulting in an immediate motor stop. Considering that motor 15 would be turning at 7,000 rpm that would be reduced to approximately 20 rpm by gear reduction transmission 19 and outputted through driven shaft 33, in association with a substantial load placed upon motor 15 through the transmission and the friction associated with the needle valve and its assembled parts, motor 15 stops instantaneously resulting in extreme accuracy in placing the valve in the position called for by the controller.

Should motor 15 be operated in the reverse direction, the voltage input would be to pin 55 while pin 53 would be at ground or low. In that situation, the voltage would begin to build on capacitor C2 that is downstream from a diode D5. NPN transistor Q7 has its base connected to pin 55 and its emitter connected between capacitor C2 and diode D5. The collector of transistor Q7 is connected to the gate of P-channel MOSFET Q3 through a diode D6 and to the gate of N-channel MOSFET Q8 that is in turn connected across resistor R6 to ground. Just as in the case when the voltage was impressed at pin 53 to drive motor 15 in the forward direction, impressing the voltage at pin 55 causes motor 15 to turn in the reverse direction (as shown by a dotted arrow) and allows capacitor C2 to charge to approximately 10.7 volts. Again, because the emitter-to-base voltage of transistor Q7 is zero, Q7 is reverse biased or turned off and no current is received at the collector so that the gate of MOSFET Q3 is zero allowing full current to pass between the source (pin 55) through the drain of MOSFET Q3 to pin 65 of motor 15 and at the same time, the zero voltage at the gate of the N-channel MOSFET Q8 prevents it from passing any current from its source through its drain, or vice versa.

When the power to pin 55 is terminated by the controller, the voltage at the base of transistor Q7 immediately drops to zero while the stored voltage on capacitor C2 begins to increase the potential at the emitter of Q7 thereby forward biasing it and turning it on so that current is received at the collector to be passed immediately to the gate of MOSFET Q8 and through diode D6 to the gate of MOSFET Q3. The positive potential buildup at the gate of MOSFET Q3 terminates the current flow from source to drain and terminates the current passing to pin 65 while any back EMF is drained across a diode D7 to the source of N-channel MOSFET Q8. The positive of voltage appearing at gate of MOSFET Q8 is developed because of the resistance at R6 thereby turning on the source-to-drain flow of back EMF through MOSFET Q8 to ground.

To describe the novel limit-switch protection of the circuit, normally-open, physically-activated limit-switch means 73 is interconnected the voltage source, voltage-regulated, current-passing means 57 and voltage-actuated first switch means 69. It is preferred that means 73 comprise limit switches SW1 and SW2, previously introduced herein.

To further illustrate the operation, starting with the situation where voltage is impressed at pin 53 and pin 55 is held at ground or low, and motor 15 is operating in the forward direction, when the slide on potentiometer 39 (see FIG. 2) reaches the normally-open limit switch SW1, it closes. When the contacts of switch SW1 are closed, the input voltage is applied directly to the gate of MOSFET Q5 and to the anode of diode D3. Resistors R7 and R8 are interconnected respectively across limit switches SW1 and SW2 and to MOSFETS Q1, Q5, Q3 and Q8 to insure the polarity remains constant for the MOSFETs. Diode D3 becomes forward biased which increases the voltage at the gate of MOSFET Q1 to approximately 11.3 volts. This high-gate voltage forces MOSFET Q1 to turn off suddenly, and insures it will remain off. With the input voltage also applied directly to the gate, the gate-to-source voltage potential of MOSFET Q5 turns it "on" allowing drain of reverse EMF from motor 15 through diode D4 directly to ground. This direct path allows for a fast discharge of the EMF which forces the motor to stop quickly.

When the voltage is impressed at pin 55, making pin 53 low, motor 15 turns in the opposite direction. Upon closing limit switch SW2, source voltage (at pin 55) is immediately applied to the gate of MOSFET Q8 and to the anode of diode D6. The gate at MOSFET Q3 is accordingly increased to approximately the source voltage which suddenly turns it off. This sudden turn off of source voltage to motor 15 is accompanied by a simultaneous opening or turning MOSFET Q8 "on" allowing the back EMF to be drained through diode D7 and across the source to drain of MOSFET Q8 to ground.

A unique feature of this limit switch aspect of the control circuit is that the limit switch remains open during all normal operation and only closes when it is to shut down the operation of motor 15. This is in marked contrast to the prior art where the limit switch remains closed during normal operation and only opens when the motor is to be stopped because of the valve-turning mechanism reaching one of the preset limits. In this unique, inventive control circuit, there are no loads on limit switches SW1 and SW2 so that their lives are greatly extended. Below is listed a table showing the relative values of the components described herein.

TABLE

| Resistors | | MOSFETs | |
|---|---|---|---|
| R1 | ½ Watt, 1.6 Ohm | Q1 | P-channel 1RF9520 |
| R2 | ¼ Watt, 10 K | Q3 | P-channel 1RF9520 |
| R3 | ½ Watt, 1.6 Ohm | Q5 | N-channel 1RFD-123 |
| R4 | ¼ Watt, 10 K | Q8 | N-channel 1RFD-123 |
| R5 | | | |
| R6 | | | |
| R7 | 1.6 mW | | |
| R8 | 1.6 mW | | |
| Capacitors | | | |
| C1 | 22 uF 25 V | | |
| C2 | 22 uF 25 V | | |
| Diodes | | | |
| D1 | 1N4002 | | |
| D2 | 1N4148 | | |
| D3 | 1N4148 | | |
| D4 | | | |
| D5 | | | |
| D6 | | | |
| D7 | | | |
| Transistors | | | |
| Q2 | PNP 2N4403 | | |
| Q4 | PNP 2N4403 | | |
| Q6 | PNP 2N4403 | | |
| Q7 | PNP 2N4403 | | |

Means 57 may also be in the form of an NPN transistor while means 59 may include inductors, transducers, and variable resistors. Means 67 may include batteries while means 71 may include other types of transistors.

While the invention has been described by reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

What is claimed is:

1. A control circuit for limiting the current flow to an electric motor, to reduce current spikes at motor start up, and for instantaneously braking rotation of the motor upon termination of power from a direct voltage source comprising:

a) voltage-regulated, current-passing means for passing current from the direct voltage source to the motor, said means having a default configuration such as to permit full current flow thereacross when the voltage is initially applied;

b) voltage drop means interposed the voltage source and said voltage-regulated, current-passing means responsive to the current flow to the motor;

c) variable-voltage output means responsive to the voltage drop developed in said voltage drop means for providing a subsequently changing voltage for input to said current-passing means for limiting the current flow therethrough following initial application of the voltage;

d) means for storing a potential during circuit operation including a normally-open, voltage-actuated first switch means for isolating said stored potential from the rest of said circuit during motor operation;

e) a normally-open, voltage-actuated second switch means interconnected said first switch means, the motor, and ground during application of power to the motor; and, f) whereupon terminating the voltage to said motor causes said first switch means to close and release said stored potential simultaneously to said current passing means to deactivate said current-passing means and to said second switch means to ground the motor terminals to immediately drain all forward and reverse EMF to ground and stop rotation of the motor.

2. The control circuit of claim 1 wherein said means for storing a potential during circuit operation additionally includes a capacitor interconnected the voltage source to the motor and ground.

3. The control circuit of claim 1 wherein said means for storing a potential comprises a battery.

4. The control circuit of claim 1 wherein said voltage-regulated, current-passing means comprises a voltage-dependent, switching transistor for coupling and uncoupling the voltage source to the motor, said switching transistor having a default configuration such as to permit coupling the source voltage to the motor during motor operation.

5. The control circuit of claim 4 wherein said voltage-regulated, current-passing means comprises a P-channel FET transistor.

6. The control circuit of claim 1 wherein said normally-open, voltage-actuated first switch means comprises a normally-conducting PNP transistor whose base and emitter are interconnected the voltage source across the voltage drop means and said emitter is interconnected said means for storing a potential so that during motor operations said transistor is non-conducting and, upon termination of the voltage source, a potential is fed to said emitter from said potential storing means to close said first switch means and establish a current flow therethrough.

7. The control circuit of claim 1 wherein said normally-open, voltage-actuated second switch means comprises a voltage-dependent, switching transistor having an open default configuration and, upon termination of the source voltage, receiving a potential at the gate from said first switch means to close and pass forward and reverse EMF from said motor to ground.

8. The control circuit of claim 1 wherein said normally-open, voltage-actuated second switch means comprises a FET transistor.

9. The control circuit of claim 1 further including a diode operably interposed the source voltage and said means for storing a potential during circuit operation to isolate said potential storing means from the circuit.

\* \* \* \* \*